United States Patent
Peele et al.

[11] Patent Number: 5,990,823
[45] Date of Patent: Nov. 23, 1999

[54] WAVELET-BASED RADAR

[75] Inventors: Lawrence C. Peele; Albert N. Pergande, both of Orlando, Fla.

[73] Assignee: Lockheed Martin Corporation, Bethesda, Md.

[21] Appl. No.: 08/852,290

[22] Filed: May 7, 1997

[51] Int. Cl.[6] .................................................. G01S 13/00
[52] U.S. Cl. ............................ 342/90; 342/192; 342/196; 342/202
[58] Field of Search .............................. 342/90, 192, 193, 342/196, 42, 202

[56] References Cited

U.S. PATENT DOCUMENTS

| | | |
|---|---|---|
| 5,124,930 | 6/1992 | Nicolas et al. . |
| 5,173,880 | 12/1992 | Duren et al. . |
| 5,198,748 | 3/1993 | Tsui et al. . |
| 5,347,479 | 9/1994 | Miyazaki . |
| 5,392,255 | 2/1995 | LeBras et al. . |
| 5,481,269 | 1/1996 | Imhoff et al. . |
| 5,486,833 | 1/1996 | Barrett ..................................... 342/204 |
| 5,495,554 | 2/1996 | Edwards et al. . |
| 5,504,487 | 4/1996 | Tucker ....................................... 342/90 |
| 5,561,431 | 10/1996 | Peele et al. . |
| 5,592,171 | 1/1997 | Jordan ........................................ 342/26 |
| 5,619,998 | 4/1997 | Abdel-Malek et al. ............ 128/660.07 |

OTHER PUBLICATIONS

T.H. Einstein, "Generation of High Resolution Radar Range Profiles and Range Profile Auto–Correlation Functions Using Stepped–Frequency Pulse Trains," Project Report No. ESD–TR–84–046, Massachusetts Institute of Technology, Lincoln Laboratory, Lexington, MA, pp. 1–133, Oct. 18, 1994.

I. Daubechies, "Orthonormal Bases of Compactly Supported Wavelets," *Communications on Pure and Applied Mathematics*, vol. XLI, pp. 909–996, 1988.

*Primary Examiner*—Ian J. Lobo
*Attorney, Agent, or Firm*—Burns, Doane, Swecker & Mathis, LLP

[57] ABSTRACT

Method and apparatus for developing high range resolution radar target profiles. An outgoing radar waveform is encoded with coefficients corresponding to a wavelet transformation and then transmitted in the direction of a radar target. Incoming waveforms, including return waveforms reflected from the radar target, are decoded using an inverse wavelet transform to produce a high range resolution profile of the target. In an exemplary embodiment, the outgoing waveform is phase-shifted to create finite-duration waveform pulses, each pulse having a phase-state pattern corresponding to a set of coefficients in a transposed wavelet transform matrix. Phase-state duration is adjusted to achieve a desired range resolution.

18 Claims, 4 Drawing Sheets

WAVELET-BASED RADAR

BACKGROUND OF THE INVENTION

The present invention relates to radar systems, and more particularly, to the development of high resolution range (HRR) radar target profiles.

Many present day radar systems combine frequency-stepped transmit waveforms with Fourier-type receiver decoding in order to develop HRR target profiles. In other words, transmit waveform pulses of incrementally increasing frequency are sent out in the direction of a target, and reflected return signals are received and then Fourier-transformed to produce coefficients indicating individual target scatters. The resolution of the resulting target profiles is inversely proportional to the frequency range, or Agile Bandwidth, of the discrete frequency-stepped pulses. In conventional non-FFT radar systems, resolution is proportional to pulse width, and because very short pulses can be difficult to generate, FFT HRR systems are superior to conventional non-FFT systems in certain contexts.

The Fourier-based systems are premised on the fact that the frequency-stepping process is equivalent to encoding an inverse-Fourier transform on the outgoing transmit signal. Such systems are described in, for example, "Generation of High Resolution Radar Range Profiles and Range Profile Auto-Correlation Functions Using Stepped-Frequency Pulse Trains" (Project Report No. ESD-TR-84-046), by T. H. Einstein, Massachusetts Institute of Technology, Lincoln Laboratory, Lexington, Mass., Oct. 18, 1994. While Fourier-based HRR systems do provide advantages over traditional coarse-range systems as noted above, the Fourier transform process is computationally intensive, requiring on the order of $N\log_2 N$ complex multiply-and-accumulate operations for an N-point transform. As a result, Fourier-based systems are limited in terms of speed, and therefore in terms of radar range resolution, and may be unsuitable in modern applications requiring high speed and accuracy. Thus, there is a need for a radar system in which HRR profiles can be generated more quickly and with finer resolution as compared to known systems.

SUMMARY OF THE INVENTION

The present invention fulfills the above-described and other needs by providing a radar in which transmitted waveforms are encoded with wavelet transform coefficients, and in which received waveforms are decoded using an inverse wavelet transform process. By strategically utilizing wavelet transforms, which are described below, a radar constructed in accordance with the teachings of the present invention can generate HRR target profiles with increased speed and significantly reduced computational complexity as compared to Fourier-based systems.

In an exemplary embodiment, a radar transmitter periodically shifts the phase of outgoing finite-duration radar transmit pulses, each pulse having a distinguishable phase pattern which corresponds to a row in the transpose of a wavelet transform matrix. A radar receiver then transforms incoming signals, including radar return signals from reflecting radar targets, using a non-inverted version of the wavelet transform matrix. This novel use of a wavelet transform matrix enables the radar to create an N-cell target profile using on the order of only 2N real multiply-and-accumulate operations. Thus, the present invention represents a significant improvement over conventional Fourier-based, frequency-stepping systems. Additional features and advantages of the present invention are explained hereinafter with reference to the illustrative examples shown in the accompanying drawings.

DETAILED DESCRIPTION OF THE PREFERRED EMBODIMENTS

Figure 1:
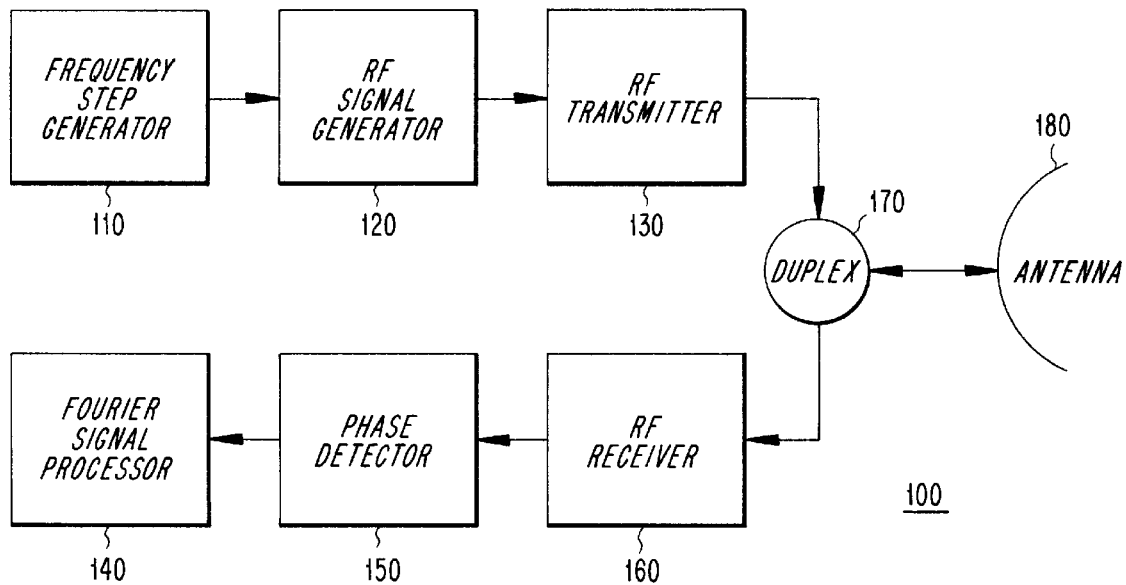
FIG. 1 is a block diagram of a known Fourier-based HRR radar system.

FIG. 1 is a conceptual diagram of a conventional, Fourier-based, HRR radar system 100. As shown, a transmit signal processing path includes a frequency step generator 110, a radio frequency (RF) signal generator 120, and an RF transmitter 130. Additionally, a receive signal processing path includes a Fourier signal processor 140, a phase detector 150, and an RF receiver 160. Both the transmit and receive signal processing paths are coupled through a duplexer 170 to an antenna 180. The duplexer 170 isolates the receive signal processing path from the antenna 180 during signal transmission, and vice versa. Alternatively, separate antennae may be used to transmit and receive radar signals.

In operation, radar waveforms (e.g., sinusoidal RF signals) generated at the RF signal generator 120 are frequency-stepped using the frequency step generator 110 to produce a transmit signal comprising a series of discrete pulses of incrementally increasing frequency. The RF transmitter 130 then transmits the frequency-stepped waveform toward a radar target using the antenna 180, and the RF receiver 160 uses the antenna 180 to receive radar return signals reflected back from the radar target. The phase detector 150 then extracts phase versus frequency information from the radar return signals, and the Fourier signal processor 140 uses the phase versus frequency information to produce HRR target profiles.

Because the frequency-stepping process is equivalent to encoding an inverse Fourier transform on the outgoing signal, the Fourier signal processor 140 is able to generate HRR target profiles by Fourier transforming the received signals. However, because the Fourier transform operates on complex numbers, the decoding process requires on the order of $N\log_2 N$ complex multiply-and-accumulate operations. Such complexity may be unacceptable in many applications.

As is well known in the art, Fourier transform analysis is based on the concept that a real signal may be represented as a (potentially infinite) sum of orthonormal, complex-exponential basis functions. Relatively recently, however, an alternative class of real orthonormal basis functions has been developed. Such basis functions are known as "wavelets" and are described, for example, in "Orthonormal Bases of Compactly Supported Wavelets", by Ingrid Daubechies, *Communications on Pure and Applied Mathematics*, vol. XLI, 1988, pp. 909–996. However, because the frequency-stepping approach used in conventional HRR radar systems is not compatible with wavelet transforms (i.e., frequency-stepping is not equivalent to encoding an inverse wavelet transform), prior art HRR systems have not been able to utilize the potential computational and speed advantages offered by wavelet analysis.

Figure 2:
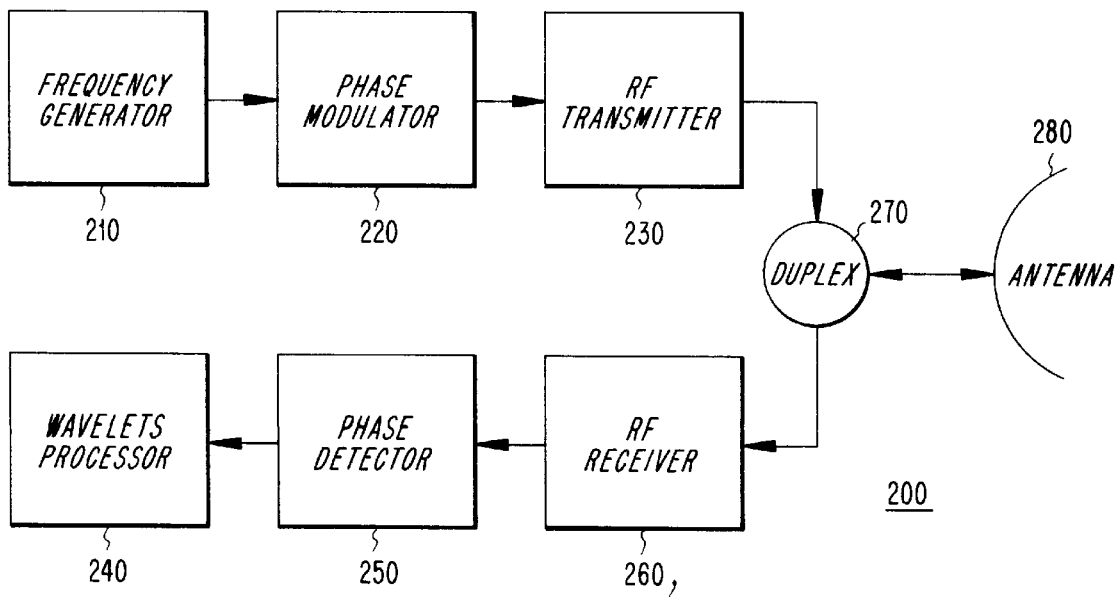
FIG. 2 is a block diagram of a wavelet-based HRR radar system constructed in accordance with the teachings of the present invention.

FIG. 2 is a conceptual diagram of an HRR radar system 200 constructed in accordance with the teachings of the present invention. As shown, a transmit signal processing path includes a frequency generator 210, a phase modulator 220, and an RF transmitter 230. Additionally, a receive signal processing path includes a wavelet processor 240, a phase detector 250, and an RF receiver 260. Both the transmit and receive signal processing paths are coupled through a duplexer 270 to an antenna 280. The duplexer 270 isolates the receive signal processing path from the antenna 280 during signal transmission, and vice versa. Alternatively, separate antennae may be used to transmit and receive signals.

In operation, single-frequency waveforms generated at the frequency generator 210 are phase-shifted at the phase modulator 220 to produce transmit waveforms comprising finite-duration waveform pulses of varying phase. As described in more detail below, the phase states of each pulse may correspond to row of coefficients in an inverted (transposed) wavelet transform matrix. The RF transmitter 230 then transmits the phase-stepped waveform toward a radar target using the antenna 280, and the RF receiver 260 uses the antenna 180 to receive radar return signals reflected back from the radar target. The phase detector 250 then extracts amplitude and phase information from the radar return signals, and the wavelet processor 240 uses the amplitude and phase information to produce HRR target profiles.

As detailed below, because the phase-stepping process is equivalent to encoding an inverse wavelet transform on the outgoing signal, and because the wavelet transform is linear with respect to multiple target scatterers, the wavelet processor 240 can quickly and effectively generate HRR target profiles. Also, because the wavelet transform operates on real numbers, the wavelet decoding process only requires on the order of 2N real multiply-and-accumulate operations.

To understand the operation of the HRR system of FIG. 2, consider the transpose $[W]^t$ of the second-order Daubechies wavelet transform matrix $[W]$ of Equation (1). Daubechies wavelet transform matrices of the second and higher orders are described in detail in the above cited reference. Note that, by definition, a wavelet transform matrix $[W]$ is an orthonormal matrix. As a result, the transpose of $[W]$, designated $[W]^t$, also represents the inverse of $[W]$, designated $[W]^{-1}$, and the product of $[W]$ and $[W]^t$ is the identity matrix.

$$[W]^t = \begin{bmatrix} \frac{1}{2} & \frac{1}{2} & \frac{1}{\sqrt{2}} & 0 \\ \frac{1}{2} & \frac{1}{2} & -\frac{1}{\sqrt{2}} & 0 \\ \frac{1}{2} & -\frac{1}{2} & 0 & \frac{1}{\sqrt{2}} \\ \frac{1}{2} & -\frac{1}{2} & 0 & -\frac{1}{\sqrt{2}} \end{bmatrix} = \begin{bmatrix} \alpha_1 & \alpha_1 & \alpha_2 & 0 \\ \alpha_1 & \alpha_1 & -\alpha_2 & 0 \\ \alpha_1 & -\alpha_1 & 0 & \alpha_2 \\ \alpha_1 & -\alpha_1 & 0 & -\alpha_2 \end{bmatrix} \quad (1)$$

The present invention teaches that such a wavelet transform matrix can be effectively encoded on a transmitted radar waveform by phase-shifting the waveform in time. To see this, first let $\theta1=\sin^{-1}\alpha1=\sin^{-1}(\frac{1}{2})$ and $\theta2=\sin^{-1}\alpha2=\sin^{-1}(1/\sqrt{2})$ in Equation (1). Then $\sin\theta1=\alpha1=\frac{1}{2}$ and $\sin\theta2=\alpha2=1/\sqrt{2}$, and the transpose wavelet transform matrix $[W]^t$ can be represented as shown in Equation (2).

$$[W]^t = \begin{bmatrix} \frac{1}{2} & \frac{1}{2} & \frac{1}{\sqrt{2}} & 0 \\ \frac{1}{2} & \frac{1}{2} & -\frac{1}{\sqrt{2}} & 0 \\ \frac{1}{2} & -\frac{1}{2} & 0 & \frac{1}{\sqrt{2}} \\ \frac{1}{2} & -\frac{1}{2} & 0 & -\frac{1}{\sqrt{2}} \end{bmatrix} \quad (2)$$

$$= \begin{bmatrix} \sin\theta1 & \sin\theta1 & \sin\theta2 & 0 \\ \sin\theta1 & \sin\theta1 & -\sin\theta2 & 0 \\ \sin\theta1 & -\sin\theta1 & 0 & \sin\theta2 \\ \sin\theta1 & -\sin\theta1 & 0 & -\sin\theta2 \end{bmatrix}$$

$$= \begin{bmatrix} \sin30° & \sin30° & \sin45° & \sin0 \\ \sin30° & \sin30° & -\sin45° & \sin0 \\ \sin30° & -\sin30° & \sin0 & \sin45° \\ \sin30° & -\sin30° & \sin0 & -\sin45° \end{bmatrix}$$

Next assume that an exemplary transmit waveform emitted from the antenna 280 of FIG. 2 is as shown in Equation (3). Equation (3) indicates that an overall transmit waveform set may comprise four waveform pulses, numbered 1–4, transmitted in sequence, each pulse containing four short-duration phase-states. The arrows in Equation (3) are intended to indicate the direction of waveform travel. Thus, it will be understood that waveform pulse 1, for example, comprises a fixed-amplitude sinusoidal pulse having a fixed frequency and including four discrete phase states of 0, θ2, θ1, and θ1, respectively. As a result, the sequence of phase-states in each of the four waveform pulses represent one row of the transpose wavelet transform matrix $[W]^t$ of Equations (1) and (2).

Transmit Pulse 1: $e^{j\theta1} \to e^{j\theta1} \to e^{j\theta2} \to e^0 \to$ (3)

Transmit Pulse 2: $e^{j\theta1} \to e^{j\theta1} \to e^{-j\theta2} \to e^0 \to$

Transmit Pulse 3: $e^{j\theta1} \to e^{-j\theta1} \to e^0 \to e^{j\theta2} \to$

Figure 3:
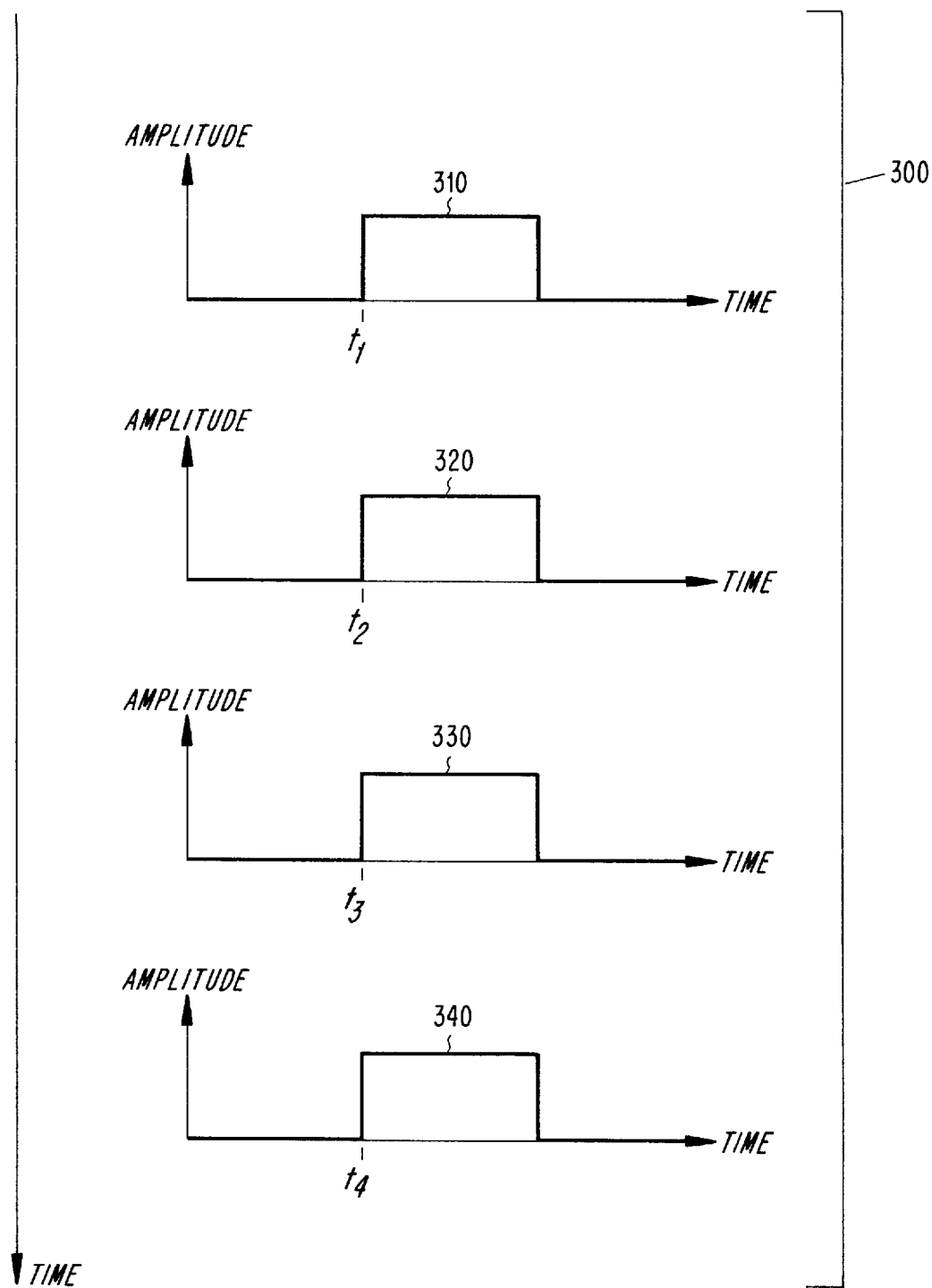
FIG. 3 depicts a transmit waveform set comprising a series of finite-duration transmit pulses arranged in accordance with the teachings of the present invention.

Transmit Pulse 4: $e^{j\theta1} \to e^{-j\theta1} \to e^0 \to e^{-j\theta2} \to$ The waveform pulses of Equation (3) are depicted in greater detail in FIGS. 3–5. As shown in FIG. 3, an exemplary waveform set 300 comprises four finite-duration waveform pulses 310, 320, 330, 340 which are transmitted in sequence at four consecutive pulse start times $t_1, t_2, t_3, t_4$. As described in more detail below, a receive waveform sample is taken (e.g., in the receive path of the device of FIG. 2) between transmission of consecutive pulses.

Figure 4A:
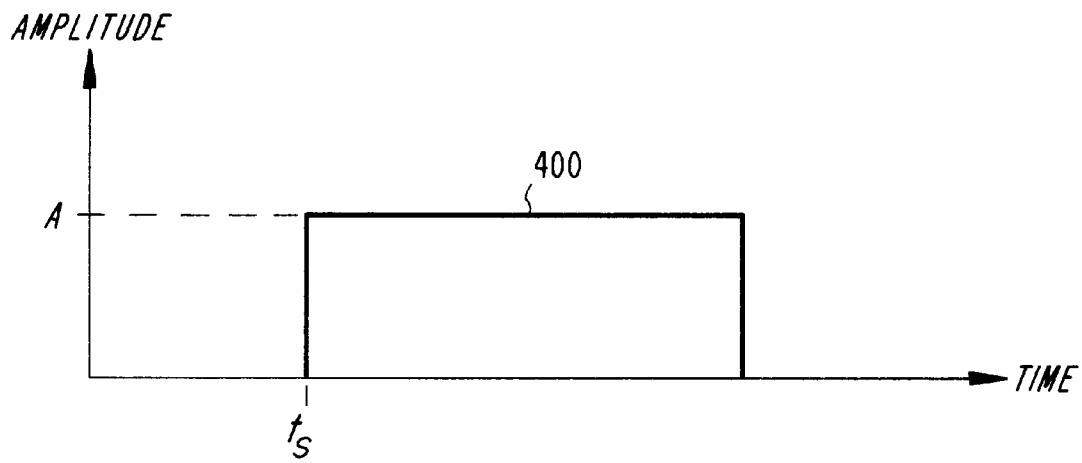
FIGS. 4(A) and 4(B) depict amplitude and phase characteristics, respectively, of a finite-duration transmit pulse transmitted according to the teachings of the present invention.
Figure 4B:
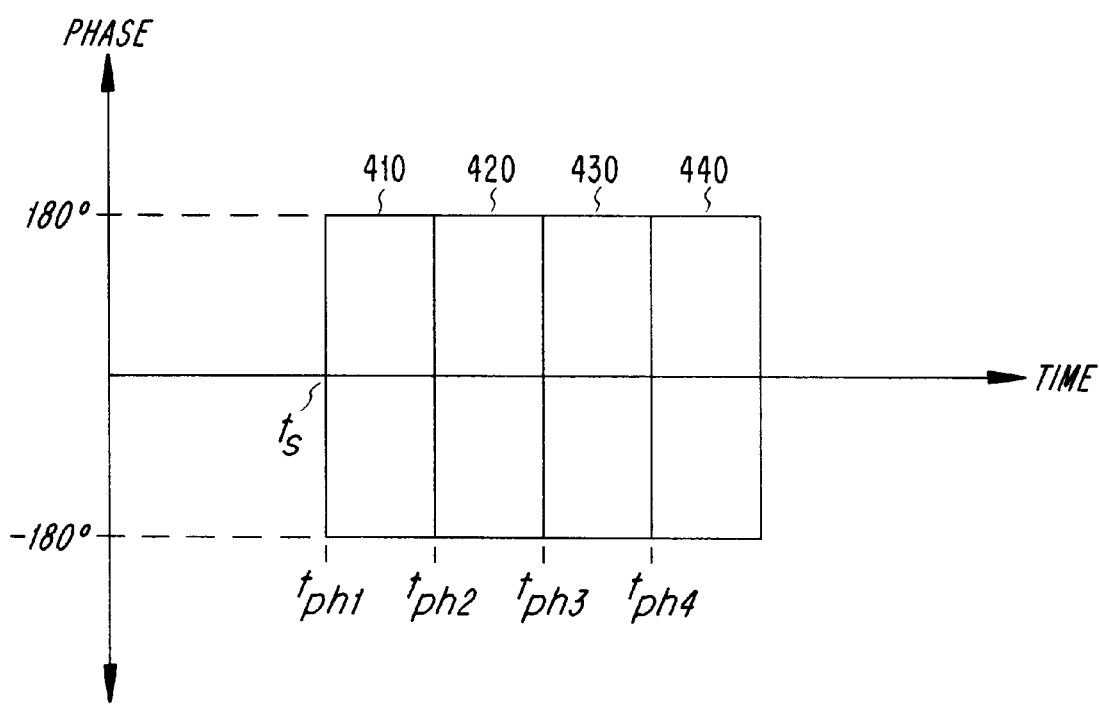
Figure 5A:
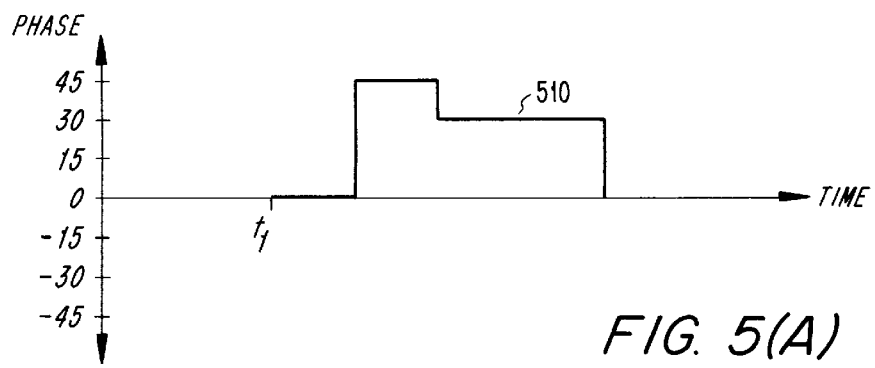
FIGS. 5(A)–5(D) depict phase characteristics of four finite-duration transmit pulses transmitted according to the teachings of the present invention.
Figure 5B:
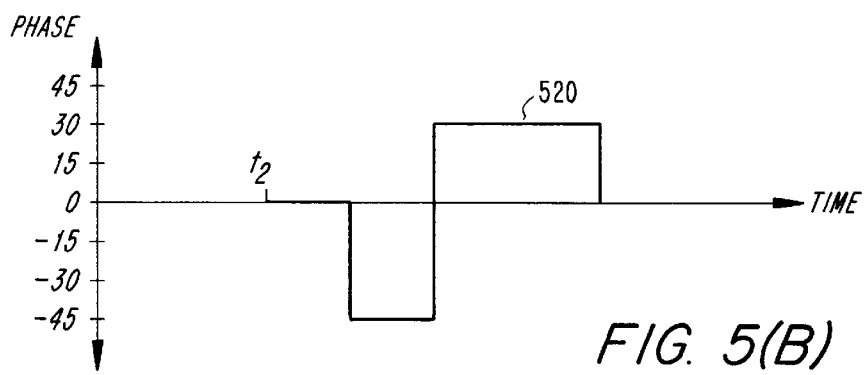
Figure 5C:
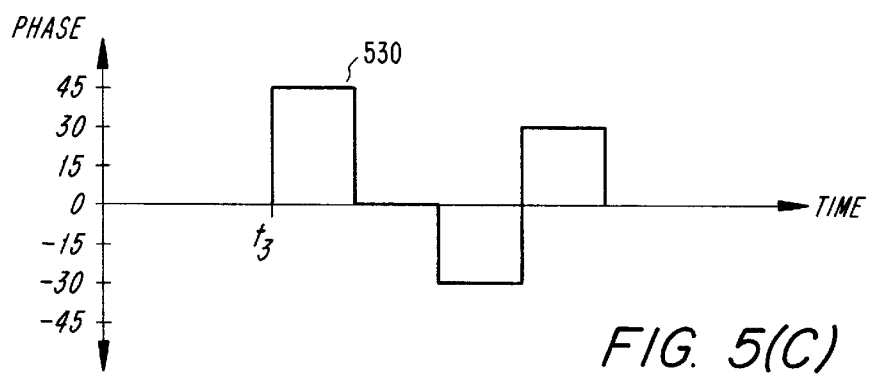
Figure 5D:
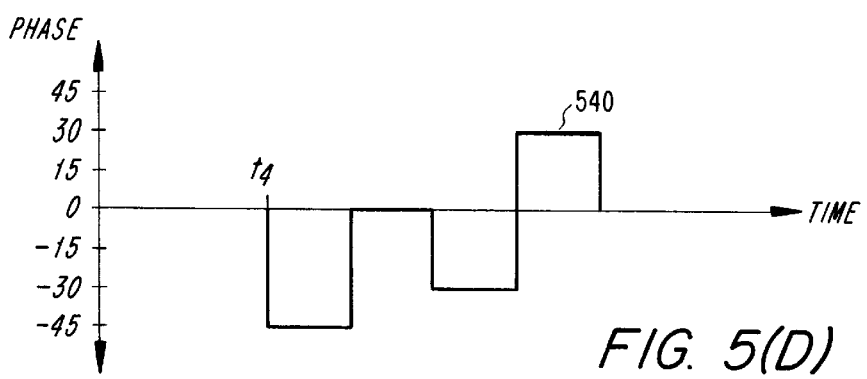

As shown in FIG. 4(A), an exemplary waveform pulse 400, corresponding to an arbitrary one of the waveform pulses 310, 320, 330, 340 shown in FIG. 3, is initiated at a pulse start time $t_s$ and has a fixed amplitude A and a fixed sinusoidal frequency (not shown). Additionally, as shown in FIG. 4(B), the exemplary waveform pulse 400 includes four phase states 410, 420, 430, 440 which are initiated at four consecutive state start times $t_{ph1}, t_{ph2}, t_{ph3}, t_{ph4}$, where the first state start time $t_{ph1}$ corresponds to the pulse start time $t_s$. As shown, each phase state 410, 420, 430, 440 can take on a value in the range ±180 degrees.

However, as shown in FIGS. 5(A)–(D), the phase states of transmitted waveform pulses are adjusted as described above to correspond to coefficients in a transposed wavelet transform matrix. In other words, the first phase-state pattern 510 of FIG. 5(A) (e.g., corresponding to the phase-states of the first transmit pulse of FIG. 3 or Equation (3)) is adjusted such that the phase of the first transmit pulse corresponds to the first row of the transpose wavelet transform matrix $[W]^t$ of Equations (1) and (2). Similarly, the second, third and fourth phase-state patterns 520, 530, 540 are adjusted such that the phases of the second, third and fourth transmit pulses correspond to the second, third and fourth rows, respectively, of the transpose wavelet transform matrix $[W]^t$ of Equations (1) and (2).

Note that the resolution of target profiles generated by the system of FIG. 2 is directly proportional to the duration of the transmit pulse phase-states (i.e., range cell length=phase-state duration×propagation velocity÷2 for round trip travel). Thus, for example, 6 ns phase-states provide approximately 3-foot range cell resolution, assuming a free-space propagation velocity of c=186,300 miles/sec. Advantageously, today's high speed phase modulators can accommodate phase-shifting at rates fast enough to produce such short-duration phase-states.

Next assume, for example, that the waveform pulses in Equation (3) are transmitted sequentially and that incoming waveforms arriving at the antenna 280 are sampled between successive transmissions. In other words, transmit pulse 1 is transmitted, then a first receive waveform sample is taken, then transmit pulse 2 is transmitted, then a second receive waveform sample is taken, etc. Assuming for example that points scatterers of amplitude $A_1, A_2, A_3,$ and $A_4$ are located in fine-range cells 1 (closest), 2, 3, and 4 (furthest), respectively (where, for a phase-state duration T, the range extent for each cell is cT/2), then, assuming the four received waveforms are sampled at the same time delay, the four received waveform samples are as in Equation (4).

Receive Sample 1: $A_1 e^{j\theta 1} + A_2 e^{j\theta 1} + A_3 e^{j\theta 2} + A_4 e^0$ (4)

Receive Sample 2: $A_1 e^{j\theta 1} + A_2 e^{j\theta 1} + A_3 e^{-j\theta 2} + A_4 e^0$ Receive Sample 3: $A_1 e^{j\theta 1} + A_2 e^{-j\theta 1} + A_3 e^0 + A_4 e^{j\theta 2}$ Receive Sample 4: $A_1 e^{j\theta 1} + A_2 e^{-j\theta 1} + A_3 e^0 + A_4 e^{-j\theta 2}$ If only the imaginary components of the complex receive waveform samples are considered (i.e., if only the sine of the phase of the receive samples is used), then the receive waveform samples can be represented as real numbers $I_1, I_2, I_3,$ and $I_4$ as shown in Equation (5). Note that if a coherent radar detector (e.g., the phase detector 150 in combination with the RF receiver 160 of FIG. 1) is used to obtain the receive waveform samples, then the sine of the received samples is computed as a matter of course during the down-conversion process. In other words, wavelet-based processing can be implemented advantageously using existing hardware components.

$I_1 = A_1 \sin\theta 1 + A_2 \sin\theta 1 + A_3 \sin\theta 2 + A_4 \sin 0$ (5)

$I_2 = A_1 \sin\theta 1 + A_2 \sin\theta 1 + A_3 \sin-\theta 2 + A_4 \sin 0$ $I_3 = A_1 \sin\theta 1 + A_2 \sin-\theta 1 + A_3 \sin 0 + A_4 \sin\theta 2$ $I_4 = A_1 \sin\theta 1 + A_2 \sin-\theta 1 + A_3 \sin 0 + A_4 \sin-\theta 2$ If the receive waveform samples are treated as a row vector and post-multiplied by the transpose wavelet transform matrix $[W]^t$ of Equations (1) and (2), for example in the wavelet processor 240 of FIG. 2, then the resulting product is a row vector comprising the point scatterer amplitudes $A_1, A_2, A_3,$ and $A_4$ as shown in Equation (6).

$$[I_1, I_2, I_3, I_4][W]^t = [4A_1\sin^2\theta 1, 4A_2\sin^2\theta 1, 2A_3\sin^2\theta 2, 2A_4\sin^2\theta 2] \quad (6)$$
$$= [A_1, A_2, A_3, A_4]$$

To see that this is so, recall that the wavelet transform matrix $[W]$ is orthonormal, and note that a column vector comprising the receive samples $I_1, I_2, I_3,$ and $I_4$ is equivalent to the transposed wavelet transform matrix $[W]^t$ post-multiplied by a column vector comprising the scatterer amplitudes $A_1, A_2, A_3,$ and $A_4$. Thus, Equation (6) can be derived from the basic matrix property which holds that the transpose of a product of two matrices is equal to the reverse product of the transposes of the two matrices (i.e., $[AB]^t = [B]^t[A]^t$). This is shown in equations (7), (8) and (9).

$$\begin{bmatrix} I_1 \\ I_2 \\ I_3 \\ I_4 \end{bmatrix} = [W]^t \begin{bmatrix} A_1 \\ A_2 \\ A_3 \\ A_4 \end{bmatrix} \quad (7)$$

$[I_1, I_2, I_3, I_4] = [A_1, A_2, A_3, A_4][W]$ (8)

$[I_1, I_2, I_3, I_4][W]^t = [A_1, A_2, A_3, A_4][W][W]^t$ (9)
$= [A_1, A_2, A_3, A_4]$

Thus, the present invention teaches that, by appropriately encoding wavelet transform coefficients on an outgoing radar waveform, HRR profiles can be generated using a minimal number of computations which involve only real waveform samples. Those skilled in the art will appreciate that the foregoing example involving a size 4 wavelet transform is for illustrative purposes only, and that all larger wavelet transforms are contemplated herein. Phase-states for a size $2^m$ wavelet transform, as well as a $2^m$ wavelet transform matrix are given in Equations (10) and (11).

$$\theta 1 = \sin^{-1}\left(\frac{1}{2^{m/2}}\right) \quad \theta 2 = \sin^{-1}\left(\frac{1}{2^{(m-1)/2}}\right) \quad \ldots \quad (10)$$
$$\theta m = \sin^{-1}\left(\frac{1}{2^{1/2}}\right)$$

$$[W] = \begin{bmatrix} \sin\theta 1 & \sin\theta 1 & \sin\theta 2 & 0 & \ldots & \sin\theta m & 0 & \ldots & 0 \\ \vdots & \vdots & \vdots & \vdots & \ldots & -\sin\theta m & 0 & \ldots & \vdots \\ \vdots & \vdots & \sin\theta 2 & \vdots & \ldots & 0 & \sin\theta m & \ldots & \vdots \\ \vdots & \vdots & -\sin\theta 2 & \vdots & \ldots & \vdots & -\sin\theta m & \ldots & \vdots \\ \vdots & \vdots & \vdots & \vdots & \ldots & \vdots & 0 & \ldots & \vdots \\ \vdots & \sin\theta 1 & -\sin\theta 2 & 0 & \ldots & \vdots & \vdots & \ldots & \vdots \\ \vdots & -\sin\theta 1 & 0 & \sin\theta 2 & \ldots & \vdots & \vdots & \ldots & \vdots \\ \vdots & \vdots & \vdots & \vdots & \ldots & \vdots & \vdots & \ldots & \vdots \\ \vdots & \vdots & \vdots & \sin\theta 2 & \ldots & \vdots & \vdots & \ldots & \vdots \\ \vdots & \vdots & \vdots & -\sin\theta 2 & \ldots & \vdots & \vdots & \ldots & 0 \\ \vdots & \vdots & \vdots & \vdots & \ldots & \vdots & \vdots & \ldots & \sin\theta m \\ \sin\theta 1 & -\sin\theta 1 & 0 & -\sin\theta 2 & \ldots & 0 & 0 & \ldots & -\sin\theta m \end{bmatrix} \quad (11)$$

Note that the wavelet transforms described herein can be implemented in practice using methods far more efficient than the matrix multiplications which are depicted above in order to aid understanding. It can be shown that, for a 32-cell HRR profile, the approach of the present invention reduces the total number of multiply-and-accumulate operations by a factor of 10 as compared to the conventional Fourier-based approach. Likewise, for a 64-cell HRR profile, the required computations are reduced by a factor of 12. In general, for a $2^m$-cell HRR profile, the number of computations is reduced by a factor of $2m$.

In addition to enabling increased speed over that presently obtainable using Fourier-based systems, the present invention may improve radar systems in many other ways. For example, slower, and therefore cheaper, processors may be used to produce presently obtainable profile resolutions. Alternatively, present radar processors might be used to view larger footprints, or the load on present processors might be reduced to enable existing hardware to perform additional valuable functions.

Furthermore, the computations required to efficiently compute a wavelet transform are ordered in such a way that, by performing only part of the computations, one is able to construct a range profile which has relatively coarse resolution as compared to the range profile obtained when the entire wavelet transform is computed. Consequently, with a wavelet based system, one can process a portion of the wavelet transform, then examine a coarse range profile, and upon discovering that nothing of interest appears to exist within a targeted area, decide to cancel further processing for that particular profile. This allows a larger target area to be scanned. The above described advantage of the wavelet system of the present invention is not possible using an FFT-based system.

Although all discussion presented above is directed to the Daubechies-2 wavelet system (i.e., two non-zero coefficients in the recursion equations that define the system), the teachings of the present invention immediately apply to the Daubechies-4, 6, 8, . . . systems (i.e., 4, 6, 8, . . . non-zero coefficients in the recursion equations that define the system). Though such higher-order systems take more time to compute as compared to the Daubechies-2 system described above, they may nonetheless provide additional advantages (e.g., less sensitivity to phase-shifter speed or countermeasures such as jamming, etc.).

Those skilled in the art will appreciate that the present invention is not limited to the specific exemplary embodiments which have been described herein for purposes of illustration. For example, the conceptual block diagram of FIG. 2 is intended to only to convey the fundamental elements of a radar system in which the teachings of the present invention might be implemented. Those skilled in the art will appreciate that the present invention is readily applicable to any radar system configuration. The scope of the invention, therefore, is defined by the claims which are appended hereto, rather than the foregoing description, and all equivalents which are consistent with the meaning of the claims are intended to be embraced therein.

We claim:

1. A radar transceiver, comprising:
   a transmitter for generating and transmitting an outgoing wave sequence including a series of finite-duration pulses;
   a phase modulator coupled to said transmitter for adjusting phase states associated with the finite-duration pulses to encode an inverse wavelet transform on the outgoing wave sequence;
   a receiver for receiving an incoming wave sequence including returns from a radar scene; and
   a processor coupled to said receiver for transforming incoming wave sequence samples using a wavelet transform to produce a high range resolution (HRR) scene profile.

2. The radar transceiver of claim 1, wherein the inverse wavelet transform encoded on the outgoing wave sequence and the wavelet transform used to process the incoming wave sequence samples correspond to a Daubechies wavelet transform.

3. The radar transceiver of claim 1, wherein a duration of the phase states associated with the finite-duration pulses is adjusted to establish a desired range cell resolution.

4. The radar transceiver of claim 1, wherein a duration of the phase states associated with the finite-duration pulses is adjusted during operation of the radar in response to computed HRR profile coefficients.

5. The radar transceiver of claim 1, wherein said processor computes a subset of coefficients corresponding to a coarse scene profile and then selectively computes additional coefficients corresponding to a finer-resolution scene profile in dependence upon the subset of coefficients first computed.

6. A method for developing a radar scene profile, comprising the steps of:
   encoding an outgoing wave sequence with coefficients corresponding to a first wavelet transform;
   transmitting the outgoing wave sequence in the direction of a radar scene;
   receiving an incoming wave sequence including returns from the radar scene; and processing the incoming wave sequence using a second wavelet transform corresponding to an inverse of the first wavelet transform to produce a him range resolution (HRR) profile of the radar scene.

7. The method of claim 6, wherein said step of encoding includes phase-shifting the outgoing wave sequence to create a number of finite-duration pulses having a phase-state pattern corresponding to a set of coefficients associated with the first wavelet transform.

8. The method of claim 6, comprising the additional step of adjusting a duration of phase states in the finite-duration pulses to establish a desired range cell resolution.

9. The method of claim 6, comprising the additional step of adjusting a duration of phase states in the finite-duration pulses during operation of a radar transceiver in response to computed HRR profile coefficients.

10. The method of 6, comprising the additional step of computing a subset of coefficients corresponding to a coarse scene profile and then selectively computing additional coefficients corresponding to a finer-resolution scene profile in dependence upon the subset of coefficients first computed.

11. A radar transceiver, comprising:
a transmitter transmitting a wave sequence encoded with wavelet coefficients corresponding to a first wavelet transform; and
a receiver decoding a received wave sequence using a second wavelet transform to produce a high range resolution (HRR) scene profile.

12. The radar transceiver of claim 11, wherein the transmitted wave sequence includes a number of finite-duration pulses having a phase-state pattern corresponding to a set of coefficients in the first wavelet transform, and wherein the transmitted wave is thus phase-encoded with the first wavelet transform.

13. The radar transceiver of claim 12, wherein the second wavelet transform is an inverse of the first wavelet transform.

14. The radar transceiver of claim 12, wherein the first and second wavelet transforms correspond to a Daubechies wavelet transform.

15. The radar transceiver of claim 14, wherein the first wavelet transform is a transposed version of the Daubechies wavelet transform, and wherein the second wavelet transform is the Daubechies wavelet transform.

16. The radar transceiver of claim 15, wherein the Daubechies wavelet transform is a second order Daubechies wavelet transform equivalent to a Haar transform.

17. The radar transceiver of claim 12, wherein a duration of phase states in the finite duration pulses is adjusted during operation of the radar transceiver in response to computed profile coefficients.

18. The radar transceiver of claim 12, wherein a subset of coefficients associated with a coarse scene profile is first computed, and wherein additional coefficients associated with a finer-resolution scene profile are then selectively computed in dependence upon the subset of coefficients first computed.

* * * * *